US008891395B2

(12) United States Patent
Powell (10) Patent No.: US 8,891,395 B2
(45) Date of Patent: Nov. 18, 2014

(54) METHOD AND SYSTEM FOR REDUCING TRANSCEIVER POWER VIA A VARIABLE NUMBER OF CHANNELS

(75) Inventor: Scott Powell, Carlsbad, CA (US)

(73) Assignee: Broadcom Corporation, Irvine, CA (US)

( * ) Notice: Subject to any disclaimer, the term of this patent is extended or adjusted under 35 U.S.C. 154(b) by 189 days.

(21) Appl. No.: 13/601,996

(22) Filed: Aug. 31, 2012

(65) Prior Publication Data

US 2012/0327806 A1 Dec. 27, 2012

Related U.S. Application Data

(63) Continuation of application No. 11/859,482, filed on Sep. 21, 2007, now Pat. No. 8,270,434.

(60) Provisional application No. 60/894,240, filed on Mar. 12, 2007, provisional application No. 60/917,870, filed on May 14, 2007.

(51) Int. Cl.
*H04L 12/24* (2006.01)
*H04L 12/26* (2006.01)
*H04L 12/40* (2006.01)
*H04L 12/413* (2006.01)

(52) U.S. Cl.
CPC .............. *H04L 12/413* (2013.01); *Y02B 60/31* (2013.01); *H04L 12/40136* (2013.01); *H04L 12/40039* (2013.01); *Y02B 60/35* (2013.01)
USPC ......................................... 370/252; 370/431

(58) Field of Classification Search
CPC ............ H04L 12/413; H04L 12/40136; H04L 12/40039
USPC .................................. 370/252, 431, 437, 468
See application file for complete search history.

(56) References Cited

U.S. PATENT DOCUMENTS

| 6,192,422 | B1 | 2/2001 | Daines |
|---|---|---|---|
| 7,216,348 | B1 * | 5/2007 | deCarmo ...................... 718/105 |
| 7,633,971 | B1 * | 12/2009 | Butler et al. .................. 370/474 |
| 7,835,374 | B2 | 11/2010 | Diab et al. |
| 7,864,689 | B2 * | 1/2011 | Chan .............................. 370/248 |
| 8,179,910 | B2 | 5/2012 | Diab et al. |
| 8,352,569 | B2 | 1/2013 | Hare |
| 2002/0150057 | A1 * | 10/2002 | McClary ........................ 370/258 |
| 2004/0179497 | A1 * | 9/2004 | Foore et al. .................... 370/335 |
| 2005/0021734 | A1 * | 1/2005 | Chan .............................. 709/224 |
| 2005/0144281 | A1 * | 6/2005 | Snyder ........................... 709/226 |
| 2007/0014575 | A1 | 1/2007 | Kramer et al. |
| 2007/0067610 | A1 * | 3/2007 | Kra et al. ....................... 712/220 |
| 2008/0159304 | A1 | 7/2008 | Ozugur et al. |
| 2008/0184230 | A1 * | 7/2008 | Leech et al. .................. 718/100 |

* cited by examiner

*Primary Examiner* — Brian D Nguyen (74) *Attorney, Agent, or Firm* — Oblon, Spivak, McClelland, Maier & Neustadt, L.L.P.

(57) ABSTRACT

Aspects of a method and system for reducing transceiver power via a variable number of channels are provided. In this regard, utilization and/or availability of network and/or device resources may be determined and a configuration of channels utilized for transmitting data may be determined based on the determined utilization and/or availability of resources. Accordingly, the number of channels over which data is communicated may be altered based on determined thresholds for the utilization and/or availability of resources. Moreover, the configuration of channels utilized for communicating data may be dynamically altered by monitoring changes to the utilization and/or availability of resources. For example, the number of channels may be altered based on available bandwidth on one or more channels, based on capacity and/or available space of one or more buffers, and/or based on available power or desired power consumption of a transmitter.

20 Claims, 6 Drawing Sheets

METHOD AND SYSTEM FOR REDUCING TRANSCEIVER POWER VIA A VARIABLE NUMBER OF CHANNELS

CROSS-REFERENCE TO RELATED APPLICATIONS/INCORPORATION BY REFERENCE

This application is a Continuation of U.S. patent application Ser. No. 11/859,482, filed on Sep. 21, 2007 now U.S. Pat. No. 8,270,434. This patent application makes reference to, claims priority to and claims benefit from U.S. Provisional Patent Application Ser. No. 60/894,240 filed on Mar. 12, 2007.

This patent application also makes reference to, claims priority to and claims benefit from U.S. Provisional Patent Application Ser. No. 60/917,870 filed on May 14, 2007.

This application also makes reference to:

U.S. patent application Ser. No. 11/859,429 (now U.S. Pat. No. 8,218,567) filed Sep. 21, 2007; U.S. patent application Ser. No. 11/859,459 filed (now U.S. Pat. No. 8,665,902) Sep. 21, 2007; and U.S. patent application Ser. No. 11/859,385 (now U.S. Pat. No. 7,920,597) filed Sep. 21, 2007.

Each of the above stated applications is hereby incorporated herein by reference in its entirety.

FIELD OF THE INVENTION

Certain embodiments of the invention relate to networking. More specifically, certain embodiments of the invention relate to a method and system for low reducing transceiver power via a variable number of channels.

BACKGROUND OF THE INVENTION

Communication networks, and in particular Ethernet networks, are increasingly being relied on to transmit various types and sizes of data for a variety of applications. In this regard, Ethernet networks are increasingly being utilized to carry, for example, voice, data, and multimedia. Due to the rapidly increasing dependence on Ethernet networks, an increasing number and types of devices are being equipped to interface to Ethernet networks.

As the number of devices connected to data networks increases and higher data rates are required, there is a growing need for new transmission technologies enabling higher transmission rates over existing copper cabling infrastructures. Various efforts exist in this regard, including technologies that enable transmission rates that may even exceed Gigabits-per-second (Gbps) data rates over existing cabling. For example, the IEEE 802.3 standard defines the (Medium Access Control) MAC interface and physical layer (PHY) for Ethernet connections at 10 Mbps, 100 Mbps, 1 Gbps, and 10 Gbps data rates over twisted-pair copper cabling 100 m in length. However, with the increase in data rates more sophisticated signal processing is required. Additionally, higher data rates and more advanced circuitry may increase power consumption in networks and networking devices.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for reducing transceiver power via a variable number of channels, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for reducing transceiver power via a variable number of channels. In this regard, utilization and/or availability of network resources and/or device resources may be determined and a configuration of channels utilized for transmitting data may be determined based on the determined utilization and/or availability of resources. Accordingly, the number of channels over which data is communicated may be altered based on thresholds for the utilization and/or availability of resources. Moreover, the configuration of channels utilized for communicating data may be dynamically altered by monitoring changes to the utilization and/or availability of resources. For example, the number of channels may be altered based on available bandwidth on one or more channels, based on capacity and/or available space of one or more buffers, and/or based on available power or desired power consumption of a transmitter. Aspects of the invention may be found in, for example, Ethernet PHY devices which transmit at data rates of 1 Gbps and higher.

Figure 1:
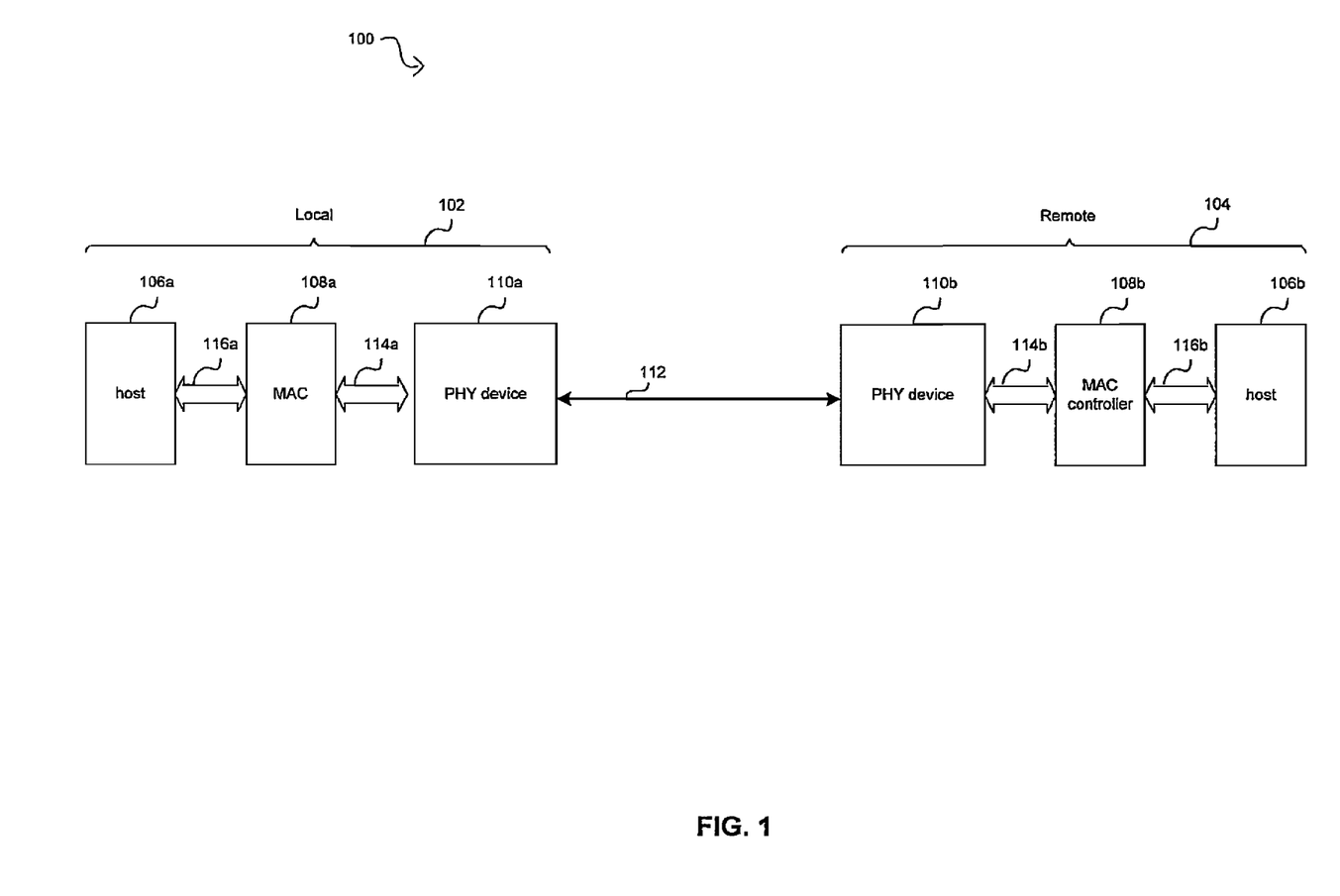
FIG. 1 is a block diagram illustrating an Ethernet connection between a local link partner and a remote link partner, in connection with an embodiment of the invention.

FIG. 1 is a block diagram illustrating an Ethernet connection between a local link partner and a remote link partner, in accordance with an embodiment of the invention. Referring to FIG. 1, there is shown a system 100 that comprises a local link partner 102 and a remote link partner 104. The local link partner 102 and the remote link partner 104 communicate via a cable 112. The cable 112 may comprise up to four or more channels, each of which may, for example, comprise an unshielded twisted pair (UTP). The local link partner 102 and the remote link partner 104 may communicate via two or more channels comprising the cable 112. For example, Ethernet over twisted pair standards 10 Base-T and 100 Base-TX may utilize two pairs of UTP while Ethernet over twisted pair standards 1000 Base-T and 10 GBase-T may utilize four pairs of UTP.

The local link partner 102 may comprise a host 106a, a medium access control (MAC) controller 108a, and a PHY device 104a. The remote link partner 104 may comprise a host 106b, a MAC controller 108b, and a PHY device 110b. Notwithstanding, the invention is not limited in this regard. In various embodiments of the invention, the link partner 102 and/or 104 may comprise, for example, computer systems or audio/video (A/V) enabled equipment. In this regard, A/V equipment may, for example, comprise, a microphone, an instrument, a sound board, a sound card, a video camera, a media player, a graphics card, or other audio and/or video device. Additionally, the link partners 102 and 104 may be enabled to utilize Audio/Video Bridging and/or Audio/video bridging extensions (collectively referred to herein as AVB) for the exchange of multimedia content and associated control and/or auxiliary data.

The PHY devices 110a and 110b may each comprise suitable logic, circuitry, and/or code that may enable communication, for example, transmission and reception of data, between the local link partner 102 and the remote link partner 104. The PHY devices 110a and 110b may support, for example, Ethernet operations. The PHY device s 110a and 110b may enable multi-rate communications, such as 10 Mbps, 100 Mbps, 1000 Mbps (or 1 Gbps), 2.5 Gbps, 4 Gbps, 10 Gbps, or 40 Gbps, for example. In this regard, the PHY devices 110a and 110b may support standard-based data rates and/or non-standard data rates. Moreover, the PHY devices 110a and 110b may support standard Ethernet link lengths or ranges of operation and/or extended ranges of operation. The PHY devices 110a and 110b may enable communication between the local link partner 102 and the remote link partner 104 by utilizing a link discovery signaling (LDS) operation that enables detection of active operations in the other link partner. In this regard the LDS operation may be configured for supporting a standard Ethernet operation and/or an extended range Ethernet operation. The PHY devices 110a and 110b may also support autonegotiation for identifying and selecting communication parameters such as speed and duplex mode. In this regard, the PHY devices 110a and 110b may be enabled to select the fastest configuration supported by both. In various embodiments of the invention, the PHY devices 110a and 110b may comprise suitable logic, circuitry, and/or code that may enable transmission and/or reception at a high(er) data in one direction and transmission and/or reception at a low(er) data rate in the other direction. For example, the local link partner 102 may comprise a multimedia server and the remote link partner 104 may comprise a multimedia client. In this regard, the local link partner 102 may transmit multimedia data, for example, to the remote partner 104 at high(er) data rates while the remote link partner 104 may transmit control or auxiliary data associated with the multimedia content at low(er) data rates.

The data transmitted and/or received by the PHY devices 110a and 110b may be formatted in accordance with the well-known OSI protocol standard. The OSI model partitions operability and functionality into seven distinct and hierarchical layers. Generally, each layer in the OSI model is structured so that it may provide a service to the immediately higher interfacing layer. For example, layer 1, or physical layer, may provide services to layer 2 and layer 2 may provide services to layer 3. The data transmitted may comprise frames of Ethernet media independent interface (MII) data which may be delimited by start of stream and end of stream delimiters, for example. The data transmitted may also comprise IDLE symbols that may be communicated between frames of data.

In an exemplary embodiment of the invention illustrated in FIG. 1, the hosts 106a and 106b may represent layer 3 and above, the MAC controllers 108a and 108b may represent layer 2 and above and the PHY devices 110a and 110b may represent the operability and/or functionality of layer 1 or the physical layer. In this regard, the PHY devices 110a and 110b may be referred to as Physical layer transmitters and/or receivers, physical layer transceivers, PHY transceivers, PHYceivers, or PHY, for example. The hosts 106a and 106b may comprise suitable logic, circuitry, and/or code that may enable operability and/or functionality of the five highest functional layers for data packets that are to be transmitted over the cable 112. Since each layer in the OSI model provides a service to the immediately higher interfacing layer, the MAC controllers 108a and 108b may provide the necessary services to the hosts 106a and 106b to ensure that packets are suitably formatted and communicated to the PHY devices 110a and 110b. During transmission, each layer adds its own header to the data passed on from the interfacing layer above it. However, during reception, a compatible device having a similar OSI stack may strip off the headers as the message passes from the lower layers up to the higher layers.

The PHY devices 110a and 110b may be configured to handle all the physical layer requirements, which include, but are not limited to, packetization, data transfer and serialization/deserialization (SERDES), in instances where such an operation is required. Data packets received by the PHY devices 110a and 110b from MAC controllers 108a and 108b, respectively, may include data and header information for each of the above six functional layers. The PHY devices 110a and 110b may be configured to encode data packets that are to be transmitted over the cable 112 and/or to decode data packets received from the cable 112.

The MAC controller 108a may comprise suitable logic, circuitry, and/or code that may enable handling of data link layer, layer 2, operability and/or functionality in the local link partner 102. Similarly, the MAC controller 108b may comprise suitable logic, circuitry, and/or code that may enable handling of layer 2 operability and/or functionality in the remote link partner 104. The MAC controllers 108a and 108b may be configured to implement Ethernet protocols, such as those based on the IEEE 802.3 standard, for example. Notwithstanding, the invention is not limited in this regard.

The MAC controller 108a may communicate with the PHY device 110a via an interface 114a and with the host 106a via a bus controller interface 116a. The MAC controller 108b may communicate with the PHY device 110b via an interface 114b and with the host 106b via a bus controller interface 116b. The interfaces 114a and 114b correspond to Ethernet interfaces that comprise protocol and/or link management control signals. The interfaces 114a and 114b may be multi-rate interfaces and/or media independent interfaces (MII). The bus controller interfaces 116a and 116b may correspond to PCI or PCI-X interfaces. Notwithstanding, the invention is not limited in this regard.

In operation, PHY devices such as the PHY devices 110a and 110b may conventionally transmit data via a fixed number of channels which may result in network links being underutilized for significant portions of time. In this manner, conventional PHY devices may distribute traffic evenly over all available channels and may continuously transmit IDLE symbols between packets of actual data. In this regard, conventional PHY devices may use a significant amount of power transmitting at a higher data rate than necessary. Accordingly, aspects of the invention may enable varying the number of channels that may be utilized. In this regards, the number of channels over which data may be transmitted may be reduced when link utilization is low and/or when network or device resources (e.g., power, buffer space, processor time, etc.) are limited. Similarly, the number of channels over which data may be transmitted may be increased when link utilization is high and/or when resources (e.g., power, buffers, processor time, etc.) are limited. Additionally, bit error rates and/or packet error rates of one or more channels comprising the cable 112 may be a factor in determining a configuration of channels for communication between the link partners 102 and 104. In this regard, if one or more channel has high error rates, aspects of the invention may enable powering that channel down and communicating over remaining channels comprising the cable 112. Also, in instances where bit error rates are too high, aspects of the invention may enable increasing the number of channels such that data rates may be maintained but symbol rates may be reduced.

In an exemplary operation, the link partner 102 may initially transmit data via a first, high(er), data rate via a high(er) number of channels and may determine that the first, high(er) data rate is unnecessary. Accordingly, the link partner 102 may reduce the number of channels over which data may be transmitted. In this regard, the link partner 102 may need a way to coordinate which channels and/or how many channels may be utilized to transmit data to the link partner 104. In this manner, coordinating a change in the transmission channels may prevent receive errors at the link partner 104. Accordingly, aspects of the invention may enable the link partner 102 to transmit one or more symbols to indicate a forthcoming change in which channels and/or how many channels may be utilized to transmit data. In this manner, one or more unique symbols may be defined to identify each of a plurality of possible channels and/or channel combinations. Accordingly, in various embodiments of the invention, prior to changing to a particular channel and/or changing the number of channels that may be utilized for transmitting data, the link partner 102 may transmit one or more symbols which signals a forthcoming change in channels. Moreover, the symbols which identify changes in a channel configuration may be in addition to, in place of, or a modified form of conventional IDLE symbols. In various embodiments of the invention, the new symbol rate may be negotiated in a manner similar to autonegotiation.

Figure 2:
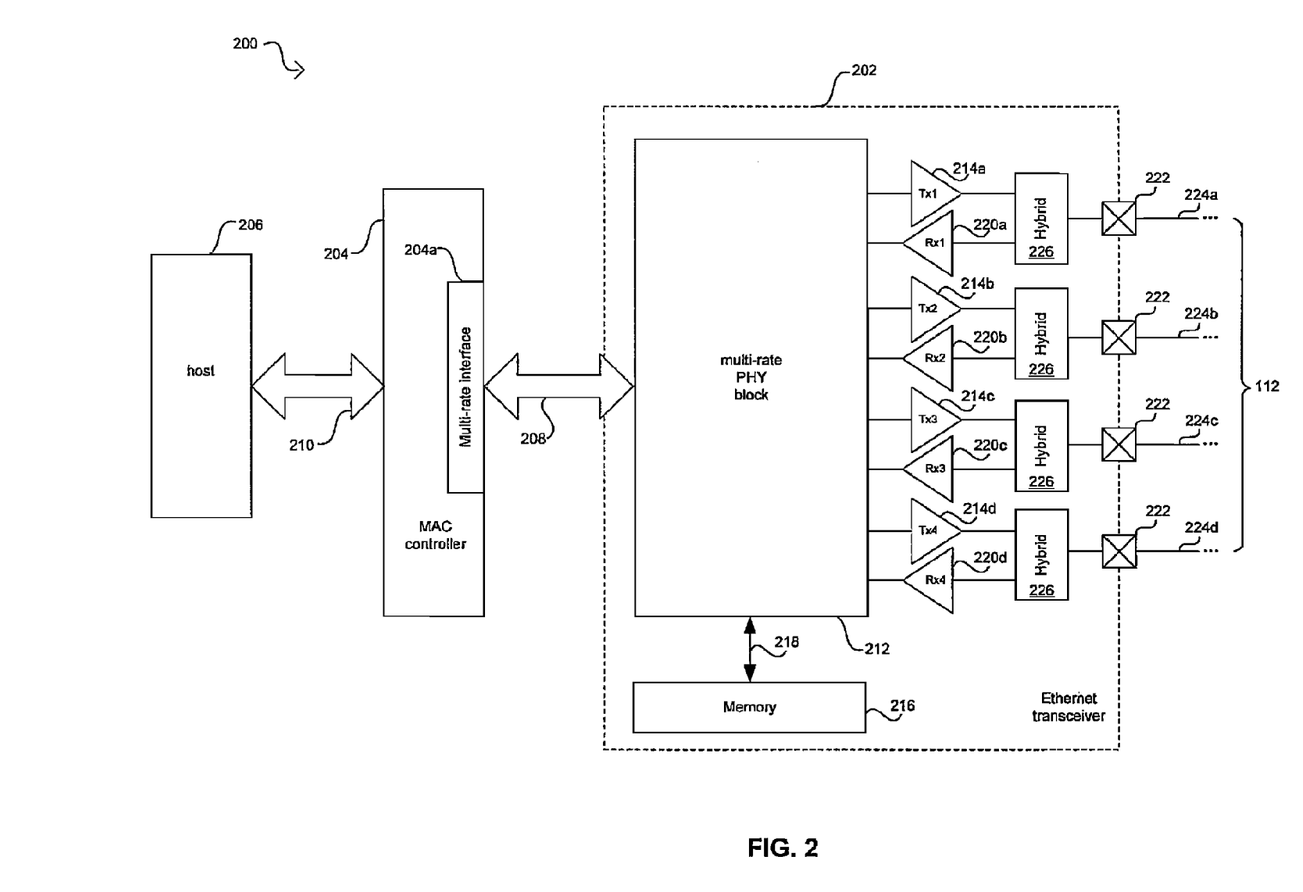
FIG. 2 is a block diagram illustrating an exemplary Ethernet over twisted pair PHY device architecture comprising a multi-rate physical block, in accordance with an embodiment of the invention.

FIG. 2 is a block diagram illustrating an exemplary Ethernet over twisted pair PHY device architecture comprising a multi-rate physical block, in accordance with an embodiment of the invention. Referring to FIG. 2, there is shown a link partner 200 which may comprises an Ethernet over twisted pair PHY device 202, a MAC controller 204, a host 206, an interface 208, and a bus controller interface 210. The PHY device 202 may be an integrated device which may comprise a multi-rate physical layer block 212, one or more transmitters 214, one or more receivers 220, a memory 216, a memory interface 218, and one or more input/output interfaces 222.

The PHY device 202 may be an integrated device that comprises a multi-rate physical layer block 212, one or more transmitters 214, one or more receivers 220, a memory 216, a memory interface 218, and one or more input/output interfaces 222. The operation of the PHY device 202 may be the same as or substantially similar to that of the PHY devices 110a and 110b disclosed in FIG. 1. In this regard, the PHY device 202 may provide layer 1 (physical layer) operability and/or functionality that enables communication with a remote PHY device. Similarly, the operation of the MAC controller 204, the host 206, the interface 208, and the bus controller 210 may be the same as or substantially similar to the respective MAC controllers 108a and 108b, hosts 106a and 106b, interfaces 114a and 114b, and bus controller interfaces 116a and 116b as described in FIG. 1. The MAC controller 204 may comprise a multi-rate interface 204a that may comprise suitable logic, circuitry, and/or code to enable communication with the PHY device 202 at a plurality of data rates via the interface 208.

The multi-rate physical layer block 212 in the PHY device 202 may comprise suitable logic, circuitry, and/or code that may enable operability and/or functionality of physical layer requirements. In this regard, the multi-rate physical layer block 212 may enable generating the appropriate link discovery signaling utilized for establishing communication with a remote PHY device in a remote link partner. In this regard, a 10 base-T PHY device may transmit normal link pulses (NLPs) periodically. Similarly, during auto-negotiation, 100 Base-TX, 1000 Base-T, and 10 Gbase-T PHY devices, for example, may transmit fast link pulse (FLP) bursts, where each burst comprises a train of NLPs. The multi-rate physical layer block 212 may communicate with the MAC controller 204 via the interface 208. In one aspect of the invention, the interface 208 may be a media independent interface (MII) and may be configured to utilize a plurality of serial data lanes for receiving data from the multi-rate physical layer block 212 and/or for transmitting data to the multi-rate physical layer block 212, in order to achieve higher operational speeds such as 1 Gbps or 10 Gbps, for example. The multi-rate physical layer block 212 may be configured to operate in one or more of a plurality of communication modes, where each communication mode may implement a different communication protocol. These communication modes may include, but are not limited to, Ethernet over twisted pair standards 10 Base-T, 100 Base-TX, 1000 Base-T, 10 GBase-T, and other similar protocols that utilize multiple channels between link partners. The multi-rate physical layer block 212 may be configured to operate in a particular mode of operation upon initialization or during operation. For example, auto-negotiation may utilize the FLP bursts to establish a rate (e.g. 10 Mbps, 100 Mbps, 1000 Mbps, or 10 Gbps) and mode (half-duplex or full-duplex) for transmitting information.

The multi-rate physical layer block 212 may be coupled to memory 216 through the memory interface 218, which may be implemented as a serial interface or a bus. The memory 216 may comprise suitable logic, circuitry, and/or code that may enable storage or programming of information that includes parameters and/or code that may effectuate the operation of the multi-rate physical layer block 212. The parameters may comprise configuration data and the code may comprise operational code such as software and/or firmware, but the information need not be limited in this regard. Moreover, the parameters may include adaptive filter and/or block coefficients for use by the multi-rate physical layer block 212, for example.

Each of the transmitters 214a, 214b, 214c, 214d may comprise suitable logic, circuitry, and/or code that may enable transmission of data from the link partner 200 to a remote link partner via, for example, the cable 112 in FIG. 1. The receivers 220a, 220b, 220c, 220d may comprise suitable logic, circuitry, and/or code that may enable receiving data from a remote link partner. Each of the transmitters 214a, 214b, 214c, 214d and receivers 220a, 220b, 220c, 220d in the PHY device 202 may correspond to a channel that may comprise the cable 112. In this manner, a transmitter/receiver pair may interface with each of the channels 224a, 224b, 224c, 224d. In this regard, the transmitter/receiver pairs may be enabled to provide the appropriate communication rate and mode for each channel.

The input/output interfaces 222 may comprise suitable logic circuitry, and/or code that may enable the PHY device 202 to impress signal information onto a physical medium comprising a channel, for example a twisted pair channel comprising the cable 112 disclosed in FIG. 1. Consequently, the input/output interfaces 222 may, for example, provide conversion between differential and single-ended, balanced and unbalanced, signaling methods. In this regard, the conversion may depend on the signaling method utilized by the transmitter 214, the receiver 220, and the type of medium comprising the channel. Accordingly, the input/output interfaces 222 may comprise one or more baluns and/or transformers and may, for example, enable transmission over a twisted pair. Additionally, the input/output interfaces 222 may be internal or external to the PHY device 202. In this regard, if the PHY device 202 comprises an integrated circuit, then "internal" may, for example, refer to being "on-chip" and/or sharing the same substrate. Similarly, if the PHY device 202 comprises one or more discrete components, then "internal" may, for example, refer to being on the same printed circuit board or being within a common physical package.

In operation, the PHY device 202 may be enabled to transmit and receive simultaneously over up to four or more physical links. For example, the PHY device 202 may be enabled to transmit and receive data at 1 Gbps, 10 Gbps or higher. In this manner, the PHY device 202 may be 1 GBASE-T and/or 10 GBASE-T compliant. Accordingly, the link partner 200 may comprise a number of hybrids 226 corresponding to the number of physical links. Each hybrid 226 may comprise suitable logic, circuitry, and/or code that may enable separating transmitted and received signals from a physical link. Each hybrid 226 in the local link partner 300 may be communicatively coupled to an input/output interface 222.

In operation, the link partner 200 may communicate with a remote partner via the cable 112. For example, for 1 Gbps Ethernet, the link partner 200 may transmit data to and receive data from a remote partner via the channels 224a, 224b, 224c, and 224d. In this regard, when there is no data for the link partner 200 to transmit, then it may transmit IDLE symbols to maintain synchronization with the remote link partner. In this manner, power consumption of a network may be largely independent of the amount of actual data being transmitted over the network. Accordingly, aspects of the invention may disable, or put into a low(er) power state, one or more of the channels 224, when those one or more channels are not required to meet current and/or future demand of network and/or device resources, such as power, bandwidth, processor time, and buffer capacity.

In operation, the link partner 200 may communicate with a remote partner via, for example, the cable 112. For example, the link partner 200 may transmit, for example, multimedia content to a remote partner via the channel 224a and may receive control and/or auxiliary data associated with the multimedia content from the remote partner via the link 224b. In this regard, the link partner 200 may be enabled to utilize AVB for the transmission and/or reception of data over the channels 224a and/or 224b. Additionally, the link partner may be enabled to transmit at a first data rate and receive at a second, possibly different, data rate. For example, the link partner 200 may transmit multimedia content via the channel 224a at a data rate of 1 Gbps and may receive control data via the channel 224b at a rate of 500 Mbps. In this manner, multimedia content may be transmitted utilizing a first, high(er), number of channels and auxiliary and/or control data may be transmitted utilizing a second, low(er), number of channels. Transmitting auxiliary and/or control data utilizing a low(er) number of channels may result in power savings for the link partner 200 and/or a remote link partner with which the link partner 200 may communicate.

Figure 3:
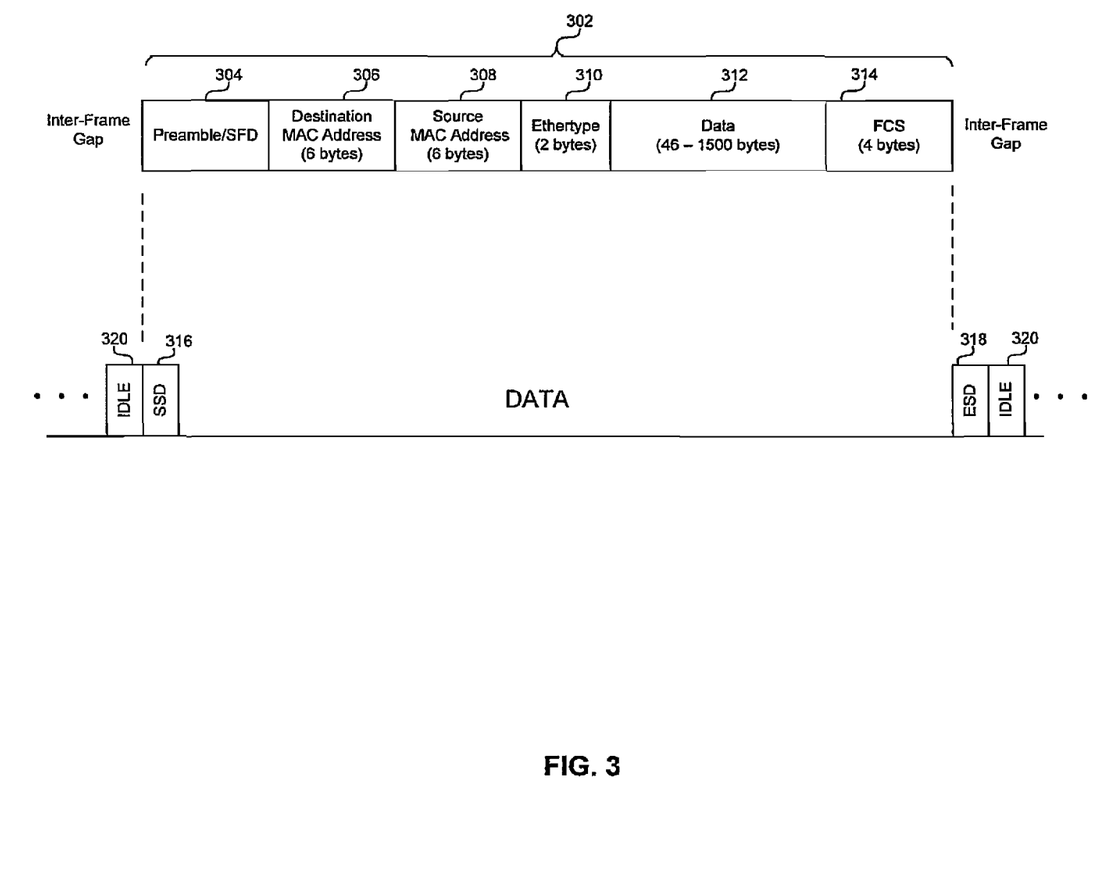
FIG. 3 is a diagram illustrating exemplary activity on an Ethernet channel, in accordance with an embodiment of the invention.

FIG. 3 is a diagram illustrating exemplary activity on an Ethernet channel, in accordance with an embodiment of the invention. Referring to FIG. 3, there is shown an exemplary Ethernet frame 302, preceded and followed by IDLE symbols 320.

The Ethernet frame 302 may comprise a preamble 304, destination MAC address field 306, a source MAC address field 308, an Ethertype field 310, a data field 312, and a frame check sequence (FCS) 314.

The first 62 bits of the preamble may be utilized to phase lock a receiving PHY device to a transmitting PHY device. The last 2 bits of the preamble, '11', may indicate the end of the preamble and that the next bit received may be real data. The final byte of the preamble (the last 8 bits ending in '11') is also known as a start of frame delimiter (SFD) 316. In various embodiments of the invention, the first 8 bits of the preamble may be replaced with a start of stream delimiter (SSD) 316 to indicate the end of an inter-frame gap and the beginning of a frame.

The destination MAC address field 306 may comprise information that may be utilized to identify the node that the frame is to be sent to. The source MAC address 308 field may comprise information that may be utilized to identify the node that originated the frame. The Ethertype field 310 may comprise information that may be utilized to identify the protocol (e.g. IPv4 or IPv6) being transported in the packet. The data field 312 may contain the data being transmitted. The FCS 314 may comprise information that may be utilized to provide error detection for the packet. In various instances, the frame 302 may be immediately followed by an end of sequence delimiter (ESD) 318 to indicate the end of a frame and the beginning of an inter-frame gap.

In operation, Ethernet frames may be transmitted utilizing a variable number of channels. For example, when an amount of data stored in one or more buffers is below a threshold, aspects of the invention may enable reducing the number of channels over which data may be transmitted. Similarly, when an amount of data stored in one or more buffers is above a threshold, for example, aspects of the invention may enable increasing the number of channels over which data may be transmitted.

Figure 4:
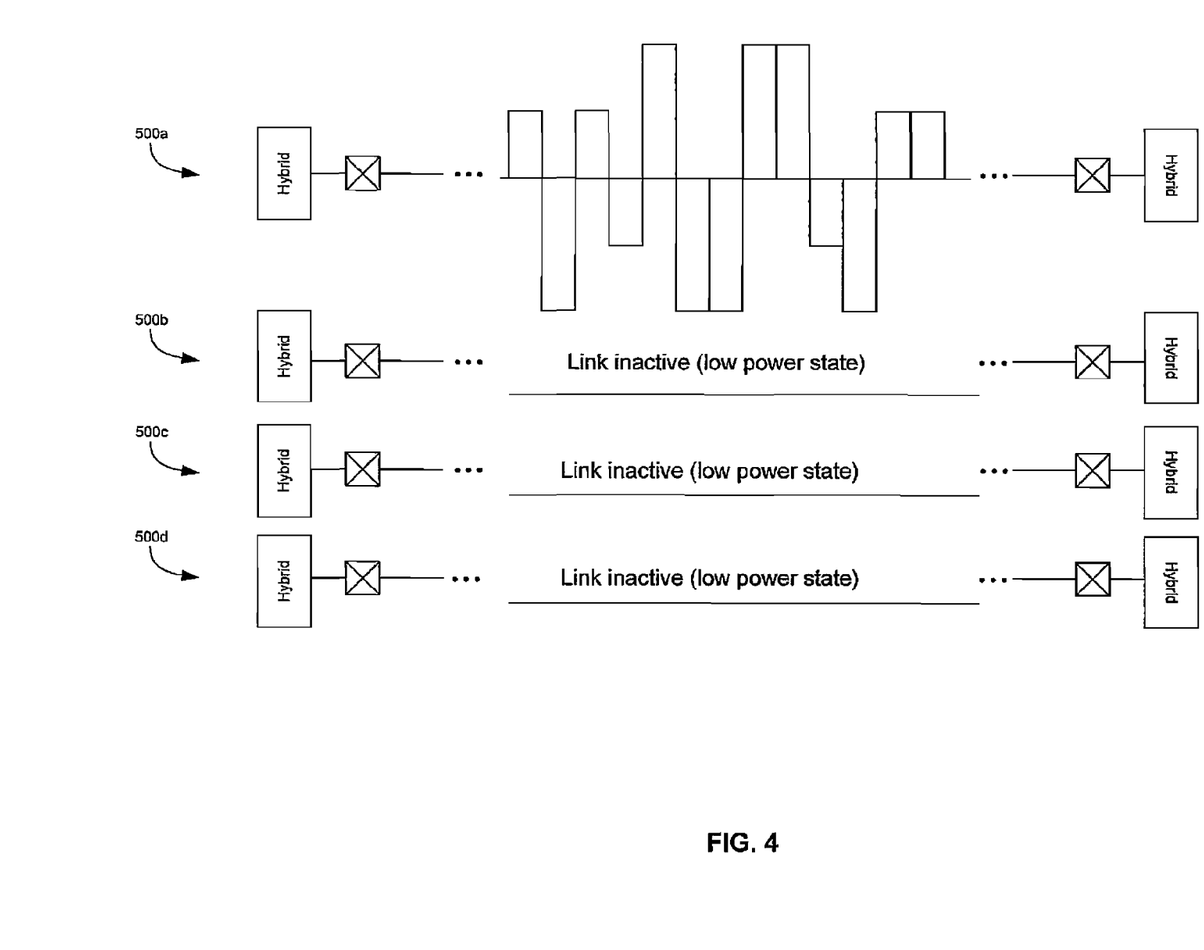
FIG. 4 is a diagram illustrating an exemplary system enabled for reduced power consumption during periods of low link utilization, in accordance with an embodiment of the invention.

FIG. 4 is a diagram illustrating an exemplary system enabled for reduced power consumption during periods of low link utilization, in accordance with an embodiment of the invention. Referring to FIG. 4 there is shown four physical channels 500a, 500b, 500c, and 500d which may exist, for example, between two link partners such as the link partner 200 of FIG. 2. In this regard, power savings may be realized by reducing one or more channels to a low(er) power or reduced activity state. For example, in the 1 Gbps system depicted, the data rate may be reduced to 750 Mbp, 500 mbps, or 250 Mbps by disabling or putting into a lower) power state, 1, 2, or 3, respectively, of the 4 channels 500a, 500b, 500c, 500d. In various embodiments of the invention, channels put into a low(er) power state may transmit signals to maintain link status. In this regard, synchronization functions, equalization, automatic gain control, adaptive echo cancellation, or other signal processing operations may be maintained during low(er) power periods transmission so that a link partner may quickly transition between different data rates. For another example, a 10 Gbps Ethernet network may transmit on only a single channel with a data rate approximately 2.5 times slower than the conventional 800 Msps to provide a data rate of 1 Gbps.

Figure 5:
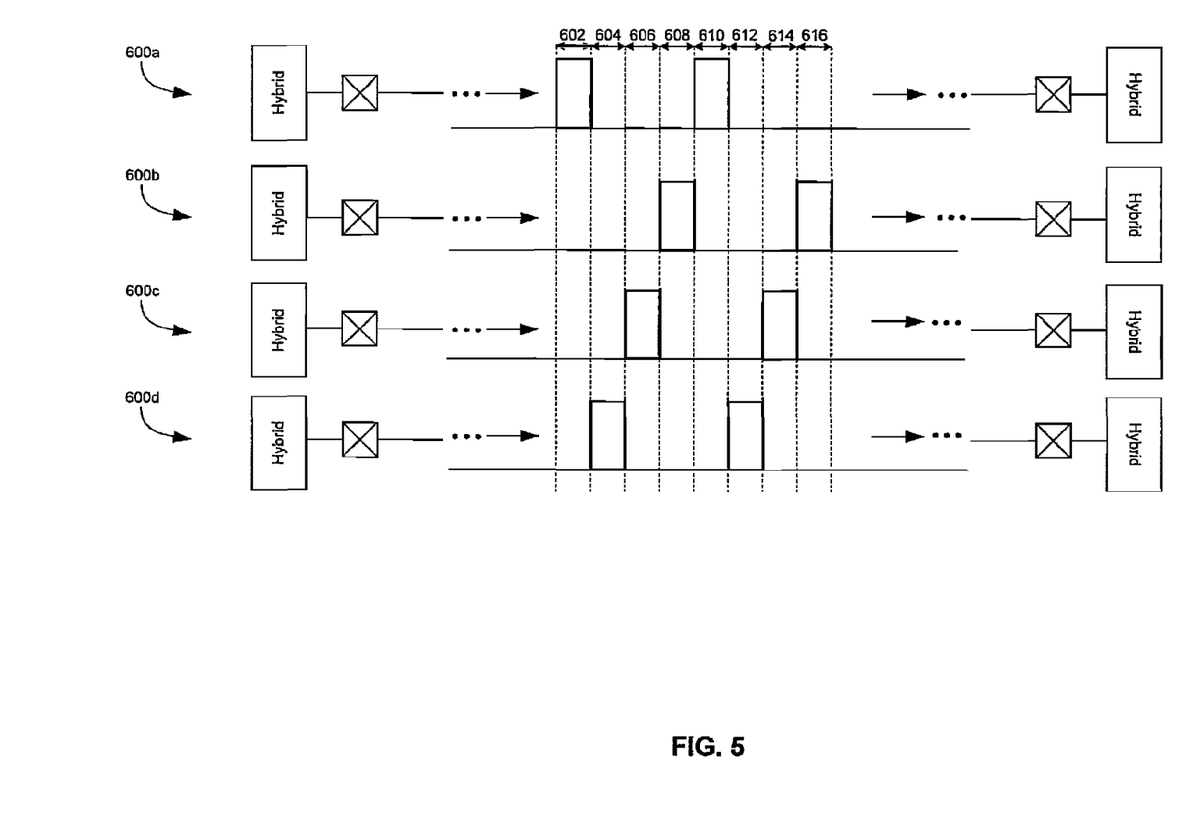
FIG. 5 is a diagram illustrating alternating channels being placed in a low(er) power state, in accordance with an embodiment of the invention.

FIG. 5 is a diagram illustrating alternating channels placed into a low(er) power state, in accordance with an embodiment of the invention. Referring to FIG. 5 there is activity on four channels 600a, 600b, 600c, 600d during intervals 602 to 616.

In operation, as discussed above, one or more channels comprising a cable, such as the cable 112 for example, may be disabled during periods of low(er) activity. In the exemplary embodiment depicted, 3 of the 4 channels 600a, 600b, 600c, 600d may be disabled or reduced to a low(er) power state and actual data may be transmitted on a reduced number of channels during a time interval. For example, data may be transmitted on the channel 600b during the interval 616, the channel 600c during the interval 614, the channel 600d during the time interval 612, and so forth. In this manner, the length of the intervals 602-616 may be chosen such that a minimum period of inactivity for each of the channels 600a, 600b, 600c, and 600d is maintained at less than a determined amount of time. In this manner, the length of the intervals 602 to 616 may be chosen such that each of the channels 600a, 600b, 600c, and 600d is able to maintain synchronization and/or other parameters necessary for the rapid transition to a higher data rate.

Figure 6:
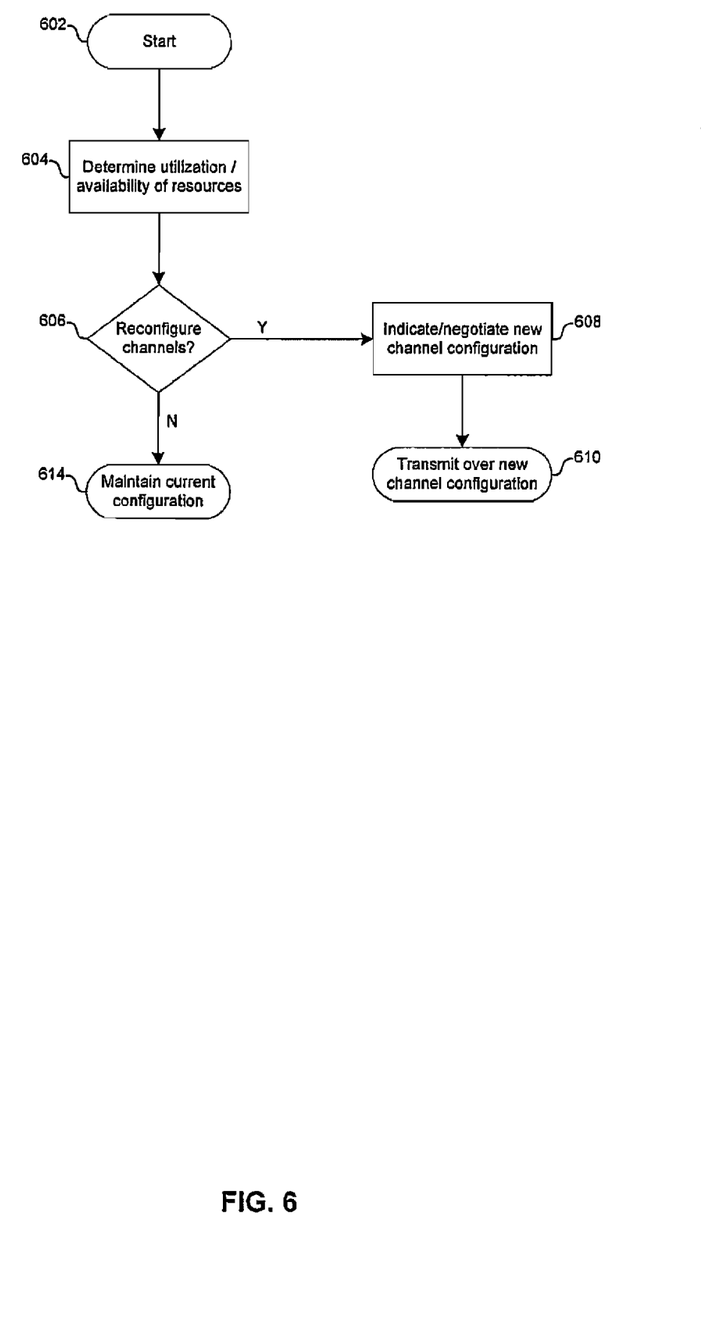
FIG. 6 is a flow chart illustrating exemplary steps for varying a channel configuration in an Ethernet network, in accordance with an embodiment of the invention.

FIG. 6 is a flow chart illustrating exemplary step varying a channel configuration in an Ethernet network, in accordance with an embodiment of the invention. Referring to FIG. 6 the exemplary steps may begin with a start step 602. Subsequent to step 602, the exemplary steps may advance to step 604. In step 604, the state of one or more network channels and the availability of resources in the network may be determined. In this regard, channel state may comprise, for example, bit error rate, packet error rate, and channel utilization; and resources may comprise, for example, power, buffer space, and processor time. Subsequent to step 604 the exemplary steps may advance to step 606. In step 606 it may be determined whether to alter the number of channels and/or which channels are utilized for network communication in response to the determined channel state and/or status of network resources and/or device resources. Accordingly, if the channel state and/or resource availability is outside of a determined range, a new channel configuration may be determined based on the channel status and/or condition of network resources and the exemplary steps may advance to step 608. In step 608, the new channel configuration may be indicated to other nodes coupled to the channel via one or more transmitted symbols. In various embodiments of the invention, the new rate may be determined by a single or "master" node or may be negotiated between multiple nodes coupled to the channel. Subsequent to step 608, the exemplary steps may advance to step 610, In step 610, transmission of data at the symbol rate determined in step 606 may begin.

Returning to step 606, if the channel status and/or resources are within a determined range, or if a channel configuration change is determined to be unnecessary or not possible, then the exemplary steps may advance to step 612. In step 612, transmission of data may continue over an unchanged channel configuration.

In various embodiments of the invention, the exemplary steps may periodically return to step 604 in order to monitor and/or discover changes to utilization and/or availability of resources. In various other embodiments one or more flag bits may be asserted when utilization and/or availability of resources reaches a threshold.

Aspects of a method and system for reducing transceiver power via a variable number of channels are provided. In this regard, utilization and/or availability of network and/or device resources may be determined and a configuration of channels, such as the channels 224, utilized for transmitting data may be determined based on the determined utilization and/or availability of resources. Accordingly, the number of channels over which data is communicated may be altered based on determined thresholds for the utilization and/or availability of resources. Moreover, the configuration of channels utilized for communicating data may be dynamically altered by monitoring changes to the utilization and/or availability of resources. For example, the number of channels may be altered based on available bandwidth on one or more channels, based on capacity and/or available space of one or more buffers, and/or based on available power or desired power consumption of a transmitter. Aspects of the invention may be found in, for example, Ethernet PHY devices which transmit at data rates of 1 Gbps and higher.

Another embodiment of the invention may provide a machine-readable storage, having stored thereon, a computer program having at least one code section executable by a machine, thereby causing the machine to perform the steps as described herein for low reducing transceiver power via a variable number of channels.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for communicating in a network, the method comprising:
   in an Ethernet device including a circuit that transmits Ethernet frames over an Ethernet cable to a remote device:
   determining a channel state of a plurality of physical channels within said Ethernet cable;
   transmitting, to the remote device, a notification message that indicates a forthcoming change in a quantity of said plurality of physical channels over which said Ethernet device transmits said Ethernet frames; and
   adjusting said quantity of said plurality of physical channels based on said channel state.

2. The method of claim 1, wherein said channel state comprises one or more of a bit error rate, a packet error rate and a channel utilization corresponding to said plurality of physical channels.

3. The method according to claim 1, wherein said adjusting comprises reducing said quantity of said plurality of physical channels over which said Ethernet device transmits said frames when said channel state is below a threshold.

4. The method according to claim 1, wherein said adjusting comprises increasing said quantity of said plurality of physical channels over which said Ethernet device transmits said frames when said channel state is above a threshold.

5. The method according to claim 1, wherein said plurality of physical channels comprise a corresponding plurality of twisted pairs of said Ethernet cable, and there is a one-to-one correspondence between said plurality of twisted pairs and said plurality of physical channels.

6. The method according to claim 1, wherein said adjusting is based on bandwidth available on said Ethernet cable.

7. The method according to claim 1, wherein said adjusting is based on capacity available to store said Ethernet frames within one or more buffers utilized by said Ethernet device.

8. The method according to claim 1, wherein said adjusting is based on a power consumption of said Ethernet device.

9. The method according to claim 1, wherein said adjusting is based on an amount of available processor time within said Ethernet device.

10. The method according to claim 1, wherein said notification message includes one or more symbols that indicate the forthcoming change in said quantity of said plurality of physical channels.

11. An Ethernet device that transmits Ethernet frames over an Ethernet cable to a remote device, said Ethernet device comprising:
a circuit that:
determines a channel state of a plurality of physical channels within said Ethernet cable;
transmits, to the remote device, a notification message that indicates a forthcoming change in a quantity of said plurality of physical channels over which said Ethernet device transmits said Ethernet frames; and
adjusts the quantity of said plurality of physical channels based on said channel state.

12. The Ethernet device of claim 11, wherein said channel state comprises one or more of a bit error rate, a packet error rate and a channel utilization corresponding to said plurality of physical channels.

13. The Ethernet device of claim 11, wherein said circuit reduces said quantity of said plurality of physical channels over which said Ethernet device transmits said frames when said channel state is below a threshold.

14. The Ethernet device of claim 11, wherein said circuit increases said quantity of said plurality of physical channels over which said Ethernet device transmits said frames when said channel state is above a threshold.

15. The Ethernet device of claim 11, wherein said plurality of physical channels comprise a corresponding plurality of twisted pairs of said cable, and there is a one-to-one correspondence between said plurality of twisted pairs and said plurality of physical channels.

16. The Ethernet device of claim 11, wherein said circuit adjusts said quantity of said plurality of physical channels based on bandwidth available on said Ethernet cable.

17. The Ethernet device of claim 11, wherein said circuit adjusts said quantity of said plurality of physical channels based on capacity available to store said Ethernet frames within one or more buffers utilized by said Ethernet device.

18. The Ethernet device of claim 11, wherein said circuit adjusts said quantity of said plurality of physical channels based on a power consumption of said Ethernet device.

19. The Ethernet device of claim 11, wherein said circuit adjusts said quantity of said plurality of physical channels based on an amount of available processor time within said Ethernet device.

20. The Ethernet device of claim 11, wherein said notification message includes one or more symbols that indicate the forthcoming change in said quantity of said plurality of physical channels.

* * * * *